United States Patent [19]

Larson

[11] 4,324,201

[45] Apr. 13, 1982

[54] MILKING INFLATION

[75] Inventor: Leigh R. Larson, Johnson Creek, Wis.

[73] Assignee: Hi-Life Rubber, Inc., Johnson Creek, Wis.

[21] Appl. No.: 206,384

[22] Filed: Nov. 13, 1980

[51] Int. Cl.³ ............................................. A01J 5/04
[52] U.S. Cl. .................................................. 119/14.51
[58] Field of Search ............... 119/14.51, 14.49, 14.50, 119/14.52, 14.53

[56] References Cited

U.S. PATENT DOCUMENTS 2,099,884 11/1937 Green ................................ 119/14.51
4,196,696 4/1980 Olander .............................. 119/14.51

Primary Examiner—Hugh R. Chamblee
Attorney, Agent, or Firm—Michael, Best & Friedrich

[57] ABSTRACT

The end of the milking inflation adapted to be slipped onto a nipple on the milker claw includes a thickened wall section in the region near the outer end of the claw nipple. The thickened wall section includes a plurality of axially-spaced, circumferentially-extending rows of circumferentially spaced external recesses which permit the thickened wall section to flex so that the inner wall thereof can sealingly engage the outer end of the claw nipple to shut off communication between the claw and the inflation when the teat cup drops off a cow's teat.

8 Claims, 6 Drawing Figures

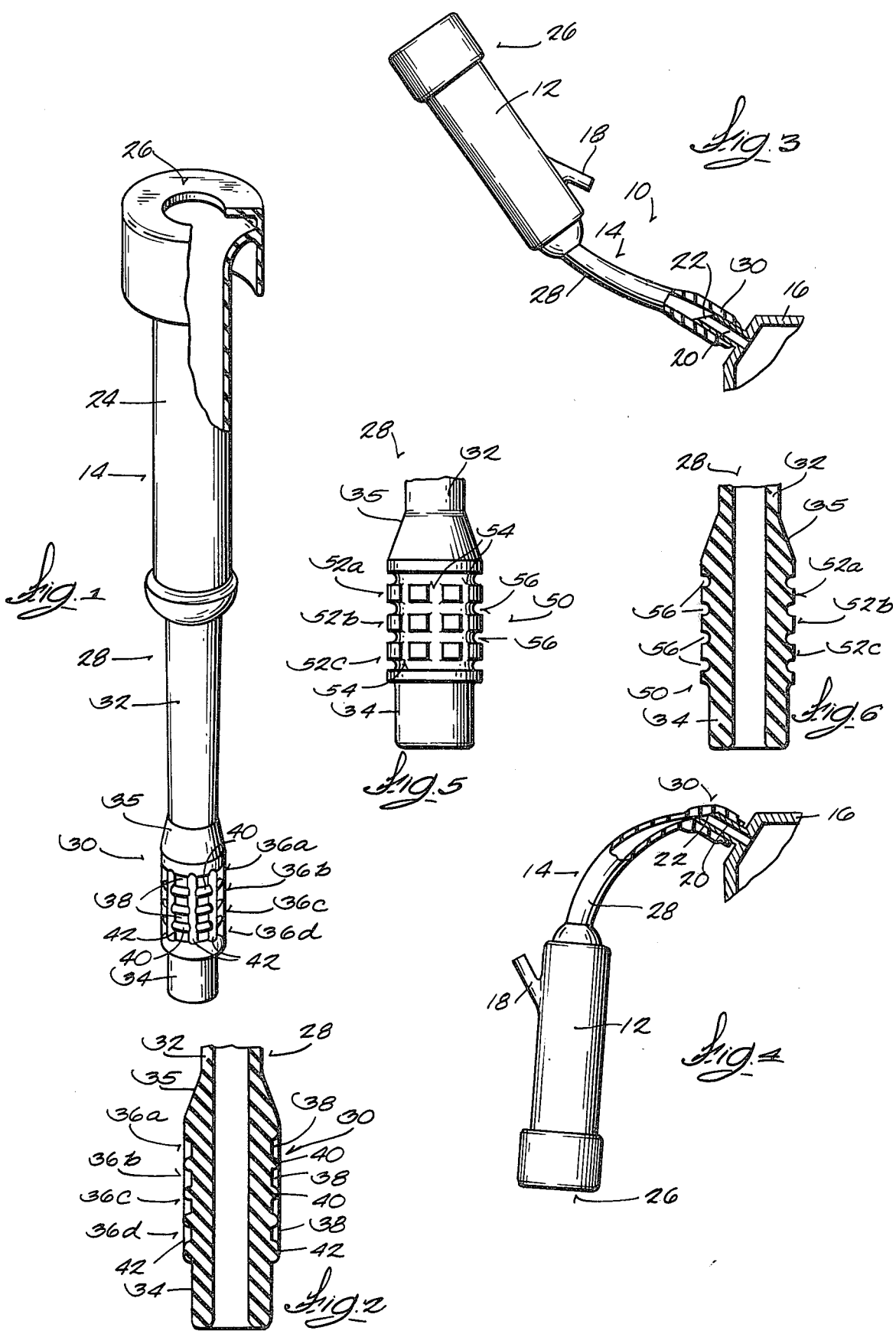

MILKING INFLATION

BACKGROUND OF THE INVENTION

The invention relates to teat cup assemblies for vacuum-operated milking machines and, more particularly, to liners or inflations for teat cup assemblies including an end portion attached to the nipple of the milking machine claw.

The teat cup assemblies for vacuum-milking machines include a liner or inflation having one end connected to a nipple on a so-called claw of the milking machine. During normal operation, the teat cup assembly is suspended from the teat of the cow and milk flows through the inflation under the influence of a vacuum maintained in the claw. When a teat cup assembly is removed from the cow's teat, either accidently or intentionally upon completion of milking, the inflation is suspended from the claw nipple in a manner to shut communication between the claw and the inflation and thereby preserve the vacuum in the system. This is accomplished by arranging the inflation so that the inner wall sealingly engages the end of the claw nipple or the walls crimp together at a location beyond the claw nipple. In either case, the inflation is bent in the region of the claw nipple and this portion is vulnerable to impacts by the cow, objects, equipment, etc. which can cause cuts, splits or tears with a resultant reduction in service life of the inflation.

Representative prior inflation constructions designed to minimize this problem are disclosed in U.S. Pats. Nos. 2,009,884 (Green) issued Nov. 23, 1937, 2,341,953 (Scott) issued Feb. 15, 1944, 2,694,379 (Hein) issued Nov. 16, 1954, 3,611,993 (Norton) issued Oct. 12, 1978 and 4,196,696 (Olander) issued Apr. 8, 1980.

The Hein patent discloses an inflation which includes a weakened wall section to facilitate crimping for shutoff but does not include any external reinforcement means for protection against impacts in the region near the outer end of the claw nipple.

The Scott and Norton patents disclose inflations which respectively include and external bead and a thickened wall section in the region near the end of the claw nipple. Such an external bead provides only a limited area of protection and a thickend wall portion reduces flexibility to the point where a complete shutoff may not occur under some circumstances.

The Green patent discloses an inflation including a plurality of axially-spaced, circumferentially-extending external ribs. While such ribs minimize the loss of flexibility and provide some protection against impacts, the thinner, stretched areas between the ribs are unprotected. Thus, these areas are vulnerable to impacts striking the claw end of the inflation in a direction extending transversely of the claw nipple.

The Olander patent discloses an inflation including a thickened wall section including a plurality (preferably 12 or more) of axially-extending, circumferentially-spaced external projections. The combined effect of the thickened wall section and the external projections substantially reduces flexibility which can reduce the shut off capability and the gripping action of the inflation on the claw nipple.

SUMMARY OF THE INVENTION

One of the principal objects of the invention is to provide a milking inflation including means for protecting the claw end against damage from impacts in the region of the claw nipple and yet permitting good shutoff when a teat cup is dropped from a cow's teat.

Another of the principal objects of the invention is to provide such a milking inflation wherein the protection means is arranged to enhance the gripping action of the inflation on the claw nipple.

A further of the principal objects of the invention is to provide such a milking inflation wherein the protection means is arranged to protect against impacts striking the claw end of the inflation in a direction either parallel to or transversly of the claw nipple.

Other objects, aspects and advantages of the invention will become apparent to those skilled in the art upon reviewing the following detailed description, the drawing and the appended claims.

The milking inflation of the invention is made from a flexible or elastomeric material, such as a rubber composition, and has a tubular body including a shell end portion adapted to fit in a teat cup shell and an opposite end portion adapted to be slipped onto the nipple on the claw of a milking machine. The claw end portion has a substantially constant inside diameter and a thickened wall section in the region near the outer end of the claw nipple. The thickened wall section includes a plurality of axially-spaced, circumferentially-extending rows of circumferentially-spaced external recesses which permit the thickened wall section to flex so that the inner wall thereof can sealingly engage the outer end of the claw nipple to shut off communications between the claw and the inflation. The flexibility provided by these recesses also enhances the gripping action of the inflation on the claw nipple.

The recesses preferably are circumferentially spaced at substantially equal intervals and the recesses in adjacent rows preferably are substantially axially aligned.

In one embodiment, the recesses in adjacent rows are isolated from each other and, in another embodiment, the recesses in adjacent rows are interconnected by a plurality of axially-spaced, circumferentially extending grooves.

BRIEF DESCRIPTION OF THE DRAWING

FIG. 1 is a perspective view of a milking inflation embodying the invention.

FIG. 2 is an enlarged, sectional view of the claw end portion of the inflation shown in FIG. 1.

FIG. 3 is a fragmentary, partially sectioned, side elevation view of a teat cup assembly carrying an inflation of FIG. 1, shown with the inflation connected to a nipple on a milker claw and with the teat cup in position for connection to a cow's teat.

FIG. 4 is a view similar to FIG. 3 with the teat cup removed from a cow's teat and the inflation in a shutoff position.

FIG. 5 is a fragmentary, perspective view of an alternate arrangement for the claw end of the inflation.

FIG. 6 is an enlarged, sectional view of the claw end portion of the inflation shown in FIG. 6.

DESCRIPTION OF THE PREFERRED EMBODIMENTS

Illustrated in FIG. 3 is a teat cup 10 including a rigid, generally cylindrical outer shell 12 which surrounds and supports a linear or inflation 14 which is connected to a milker claw 16 (shown fragmentarily). The milker 16 is connected to a suitable vacuum system (not shown) in the usual manner and has a plurality of nipples 20 (one shown) which project upwardly and outwardly from the claw 16 and have a beveled outer end 22.

Located in the side of the shell 12 is a nipple 18 connected, via suitable tubing (not shown), in communication with the vacuum systems which provides a pulsating vacuum in the chamber between the interior wall of the shell 12 and the inflation 14 to alternately contract and expand the inflation for milking.

As best shown in FIG. 1, the inflation 14 is a generally cylindrical, tubular member molded from a flexible or elastomeric material, preferably a synthetic or natural rubber composition including curing agents and the like. The inflation 14 has a shell end portion 24 which fits inside the shell 12 and includes a mouthpiece 26 adapted to receive the teat of a cow. The inflation 14 also includes a reduced claw end portion 28 which extends from the shell 12 and is slipped onto a claw nipple 20.

When the teat cup 10 is in the position illustrated in FIG. 3 with the mouthpiece 26 of the inflation 14 slipped onto a cow's teat, milk flows through the inflation 14, through the nipple 20 and into the claw 16. When the teat cup 10 is removed from a cow's teat and drops to the position shown in FIG. 4, the inner wall of the claw end portion 28 of the inflation 14 sealingly engages the beveled end 22 of the claw nipple 20 to shut off communication between the claw 16 and the atmosphere. Thus, the vacuum within the vacuum system is maintained, even though one or more of the teat cups 10 has dropped from cooperative engagement with the cow's teat.

The claw end portion 28 of the inflation 14 has a substantially constant inside diameter, a thickened wall section 30 in the region near the outer end of the claw nipple 20 and thinner wall sections 32 and 34 extending from the opposite ends of the thickened wall section 30 and having a substantially constant wall thickness. The thickened wall section 30 is arranged to provide protection against tears, splits and cuts and yet be flexible enough to insure complete shutoff and to enhance the gripping action of the inflation 14 on the claw nipple 20.

This is accomplished by providing the thickened wall section 30 with a plurality (e.g. 4) of axially-spaced, circumferentially-extending rows 36a, 36b, 36c and 36d of circumferentially-spaced external depressions or recesses 38. The recesses 38 preferably are substantially axially aligned and circumferentially spaced at substantially equal intervals.

While the depth of the recesses 38 can vary, the wall thickness of the thickened wall section 30 at the bottom of the recesses 38 preferably is substantially the same as that of the walls of sections 32 and 34. The thickened wall section 30 is integrally connected with the thinner wall section 32 by a flared wall section 35.

In the embodiment illustrated in FIGS. 1 and 2, the recesses 38 are isolated from each other by circumferentially-extending ridges 40 and axially-extending ridges 42.

In the alternate embodiment illustrated in FIGS. 5 and 6, the claw end portion 28 of the inflation 14 includes a thickened wall section 50 and the rows 52a, 52b and 52c of recesses 54 are interconnected by axially spaced, circumferentially-extending grooves 56. Otherwise, the claw end portion 28 of the inflation 14 is arranged in substantially the same manner as in the embodiment illustrated in FIGS. 1 and 2.

From the foregoing description, one skilled in the art can easily ascertain the essential characteristics of the invention and, without departing from the spirit and scope thereof, make various changes and modifications to adapt it to various usages.

I claim:

1. A milking inflation made from a flexible material and having a tubular body including a shell end portion adapted to be slipped onto a nipple on the claw of the milking machine, said claw end portion having a substantially constant inside diameter and a thickened wall section in the region near the outer end of the claw nipple, said thickened wall section having an outer surface and including a plurality of axially-spaced, circumferentially-extending rows of external recesses extending inwardly from said outer surface, each of said rows including a plurality of said recesses which are circumferentially spaced and are separated by a segment of said thickened wall section, said recesses imparting flexibility to said thickened wall section so that the inner wall thereof can sealingly engage the outer end of the claw nipple to shut off communication between the claw and the inflation.

2. A milking inflation according to claim 1 wherein said recesses in each row are circumferentially spaced at substantially equal intervals.

3. A milking inflation according to claim 2 wherein said recesses in adjacent rows are substantially axially aligned.

4. A milking inflation according to claim 2 wherein adjacent rows of said recesses are separated from each other by circumferentially-extending segment of said thickened wall section.

5. A milking inflation according to claim 2 wherein adjacent rows of said recesses are separated by a circumferentially-extending groove in said thickened wall section.

6. A milking inflation according to claim 5 wherein said grooves are axially spaced at substantially equal intervals 7. A milking inflation according to claim 1 wherein said claw end portion includes a thinner wall section having a substantially constant wall thickness and the wall thickness of said thickened wall section at said recesses is substantially the same as that for the said thinner wall section.

8. A milking inflation according to claim 1 wherein said thickened wall section includes a first end axially spaced inwardly from the outer end of the said claw end portion and a second end axially spaced inwardly from said first end; and
said claw end portion includes a thinner wall section having a substantially constant wall thickness and a flared section connecting said second end of said thickened wall section with said thinner wall section.

* * * * *